United States Patent [19]
Agesen

[11] Patent Number: 6,105,040
[45] Date of Patent: Aug. 15, 2000

[54] METHOD AND APPARATUS FOR MANAGING STORED OBJECTS

[75] Inventor: Ole Agesen, Franklin, Mass.

[73] Assignee: Sun Microsystems, Inc., Palo Alto, Calif.

[21] Appl. No.: 08/885,561

[22] Filed: Jun. 30, 1997

[51] Int. Cl.[7] .................................................. G06F 17/30
[52] U.S. Cl. ............................................................. 707/206
[58] Field of Search .................................. 707/200–206, 707/103; 711/216, 203–209

[56] References Cited

U.S. PATENT DOCUMENTS

| | | | |
|---|---|---|---|
| 4,757,438 | 7/1988 | Thatte et al. | 709/100 |
| 4,907,151 | 3/1990 | Bartlett | 711/166 |
| 4,920,483 | 4/1990 | Pogue et al. | 711/219 |
| 5,043,870 | 8/1991 | Ditzel et al. | 711/132 |
| 5,107,457 | 4/1992 | Hayes et al. | 711/132 |
| 5,222,221 | 6/1993 | Houri et al. | 709/106 |
| 5,301,288 | 4/1994 | Newman et al. | 711/202 |
| 5,355,483 | 10/1994 | Serlet | 711/154 |
| 5,408,650 | 4/1995 | Arsenault | 395/704 |
| 5,535,329 | 7/1996 | Hastings | 714/35 |
| 5,560,003 | 9/1996 | Nilsen et al. | 707/206 |
| 5,561,786 | 10/1996 | Morse | 711/170 |
| 5,566,321 | 10/1996 | Pase et al. | 711/153 |
| 5,636,362 | 6/1997 | Stone et al. | 711/129 |
| 5,813,031 | 9/1998 | Chou et al. | 711/122 |

FOREIGN PATENT DOCUMENTS 0 113 460   7/1984   European Pat. Off. .

OTHER PUBLICATIONS

Gosling, James, et al., "The Java Language Specification," Addison–Wesley, 1996.

Lindholm, Tim and Yelling, Frank, "The Java Virtual Machine Specification," Addison–Wesley, 1996.

Krasner, Glenn, "The Smalltalk–80 Virtual Machine" BYTE Publications Inc., Aug. 1991, pp. 300–320.

Grehan, Rick, "If Memory Serves . . . ," BYTE Publications, Inc., Aug. 1989.

Grehan, Rick, "Virtually Virtual Memory," BYTE Publications, Inc., Sep. 1990.

Imai, Akira and Tick, Evan, "Evaluation of Parallel Copying Garbage Collection on a Shared–Memory Multiprocessor", IEEE Transactions On Parallel and Distributed Systems, vol. 4, No. 9, Sep. 1993.

Kuechlin, Wolfgang W. and Nevin, Nicholas J., "On Multi–Threaded List–Processing and Garbage Collection," IEEE, 1991.

Harbaugh, Sam and Wavering, Bill, "HeapGuard™ Eliminating Garbage Collection in Real–Time Ada Systems," Integrated Software, Inc., No Date.

Bott, Ed, "Windows' Invisible Wall: The 64K Barrier," PC Contact, Mar. 1994.

Karen, et al., "Garbage Collection for Prolog based on WAM," Communications of the ACM, vol. 31, Issue 6, Jun. 1988.

(List continued on next page.)

*Primary Examiner*—Maria N. Vonbuhr

[57] ABSTRACT

In accordance with the present invention a method is provided for managing objects during a garbage collection operation. The process comprises the steps of compacting objects in a memory, allocating an available memory location for a surviving object and a corresponding hash field, storing the surviving object in the available memory location by copying the surviving object from a previous memory location to the available memory location, and storing a hash value for the surviving object in the hash field. The hash value includes a memory address for the previous memory location. In accordance with another aspect of the present invention, a method is provided for managing objects stored in memory. The method comprises the steps of receiving an instruction to allocate an object, locating space in a memory for the object, storing the object at the located space, and including in the stored object a header portion reflecting a hash status. The hash status is used to indicate (i) whether the object has been hashed and (ii) whether the object has a hash field.

85 Claims, 6 Drawing Sheets

OTHER PUBLICATIONS

Wallace, David V., and Tiemann, Michael, "Simple Garbage Collection in G++," Cygnus Support, No Date.

Caro, Alexander, "A Novel 64 Bit Data Representation for Garbage Collection and Synchronizing Memory", Computation Structures Group Memo 396, Apr. 9, 1997.

Courts, Robert, "Improving Locality of Reference in a Garbage–Collecting Memory Management System," Communications of the ACM, vol. 31, No. 5, Sep. 1988.

Moon, David A., "Garbage Collection in a Large Lisp System," Association for Computing Machinery, 1984.

Barrett, David A., "Improving the Performance of Conservative Generational Garbage Collection," Technical Report CU–CS–784–95, University of Colorado at Boulder, Sep. 1995.

Aho, Alfred V., Sethi, Ravi, and Ullman, Jeffrey D., "Compilers: Principles, Techniques, and Tools," Addison–Wesley Publishing Company, 1988; Copyright© 1986 by Bell Telephone Laboratories, Inc.

Jones, Richard, and Lins, Rafael, "Garbage Collection: Algorithms for Automatic Dynamic Memory Management," John Wiley & Sons, 1996.

Booch, Grady, "Object Oriented Design With Applications," The Benjamin/Cummings Publishing Company, Inc., 1991.

Hölzle, Urs, "A Fast Write Barrier for Generational Garbage Collectors," OOPSLA '93 Garbage Collection Workshop, Washington, DC, Oct. 1993.

"GC FAQ—draft," http://www.centerline.com/people/chae/GC/GC–faq.html, Jan. 6, 1997.

Shaw, Richard H., "An Introduction to the Win32 API (Programming Specification, Application Programming Interface, Power Programming)," PC Magazine, Apr. 26, 1994.

Wilson, Paul R., et al., "Dynamic Storage Allocation: A Survey and Critical Review," Department of Computer Science, University of Texas at Austin, Austin, Texas, No Date.

Chung, Kin–Man and Yuen, Herbert, "A 'Tiny' Pascal Compiler: the P–Code Interpreter," BYTE Publications, Inc., Sep. 1978.

Chung, Kin–Man and Yuen, Herbert, "A 'Tiny' Pascal Compiler: Part 2: The P–Compiler," BYTE Publications, Inc., Oct. 1978.

Thompson, Ken, "Regular Expression Search Algorithm," Communications of the ACM, vol. II, No. 6, p. 149 et seq., Jun. 1968.

Mitchell, James G., Maybury, William, and Sweet, Richard, Mesa Language Manual, Xerox Corporation, No Date.

McDaniel, Gene, "An Analysis of a Mesa Instruction Set," Xerox Corporation, May 1982.

Pier, Kenneth A., "A Retrospective on the Dorado, A High–Performance Personal Computer," Xerox Corporation, Aug. 1983.

Pier, Kenneth A., "A Retrospective on the Dorado, A High–Performance Personal Computer," IEEE Conference Proceedings, The 10th Annual international Symposium on Computer Architecture, 1983.

Wilson, P.R., et al., "Design of the Opportunistic Garbage Collector," Proceedings of the Object Oriented Programming Systems Languages An Applications Conference, New Orleans, vol. 24, No. 10, Oct. 1989.

MIT Scheme Reference, 11.5: Object Hashing, updated Oct. 27, 1994.

MIT Scheme Reference, 11.4.4: Address Hashing, updated Oct. 27, 1994.

A. Diwan, E. Moss & R. Hudson, Compiler Support for Garbage Collection in a Statically Typed Language, ACM SIGPLAN, vol. 27, No. 7, Jul. 1992.

Wiseman, Simon R., et al., "Holistic Computing," Microprocessors and Microsystems, vol. 19, No. 5, June 1995, pp. 261–267.

Tarditi, D., et al., "TIL: A Type–Directed Optimizing Compiler for ML," School of Computer Science, Carnegie Mellon University, 1996, pp. 181–192.

Diwan, Amer, et al., "Compiler Support for Garbage Collection in a Statically Typed Language," Object Systems Laboratory, Department of Copmputer Science, University of Massachusetts, 1992, pp. 273–282.

Craig Chambers, et al., "An Efficient Implementation of SELF, a Dynamically –Typed Objected–Oriented Language Based on Prototypes," OOPSLA '89 Conference Proceedings, vol. 24, No. 10, Oct. 1989, pp. 49–70.

METHOD AND APPARATUS FOR MANAGING STORED OBJECTS

BACKGROUND OF THE INVENTION

A. Field of the Invention

This invention generally relates to memory management for computer systems and, more particularly, to a method and apparatus for managing hashed objects.

B. Description of the Related Art (1) The Java™ programming language "hashCode" Method The Java™ programming language is an object-oriented computer programming language. The language is described in many texts, including one that is entitled "The Java Language Specification" by James Goslin, Bill Joy, and Guy Steele, Addison-Wesley, 1996. Java and all Java-based trademarks are trademarks or registered trademarks of Sun Microsystems, Inc. in the United States and other countries. In an object oriented system, such as one or more related programs written in this language, a "class" provides a template for the creation of "objects" (which represent items or instances manipulated by the system) having characteristics of that class. The term template denotes that the objects (i.e., data items) in each class, share certain characteristics or attributes determined by the class. Objects are typically created dynamically during system operation. Methods associated with a class generally operate on the objects of the same class. The Java language was designed to run on computing systems with characteristics that are specified by the Java Virtual Machine (JVM) Specification. The JVM specification is described in detail in a text entitled "The Java Virtual Machine Specification", by Tim Lindholm and Frank Yellin, Addison Wesley, 1996.

The Java language defines a method referred to as "hashCode( )" in the topmost class Object that defines properties shared by all objects in a Java language system. The hashCode( ) method causes the JVM, or some other runtime system that supports the Java language, to return an integer hash value corresponding to a selected object. The Java language hash code( ) operation has the following properties: (1) It ensures that an object's hash value remains constant throughout its life-time. (2) It ensures a good distribution of hash values such that different objects to a great extent have different hash values. Using such a hashCode( ) operation, programmers can build data structures, known as hash tables, that support efficient lookup (search and retrieval) of data. Hash tables require the former property to ensure correctness and the latter property to achieve high efficiency.

For example, a hashCode( ) implementation that always returns "0", while allowing correct operation of hash tables, would be a poor choice because the lack of distribution degrades performance of hash table lookup operations. An alternative implementation of the hashCode( ) operation may use the address of the object as its hash code. Because different objects are located at different addresses in memory, this implementation provides excellent distribution. However, it only applies to systems where hashed objects never move, because if an object moved to a different address, its hash code would change, violating the first property.

In most object-oriented languages, it is possible to override the virtual machine hashCode( ) method for specific classes. For example, the String class in the Java language overrides hashCode( ) to compute a hash value based on the characters in the string. Thus, the hashCode( ) operation on two "equal" strings that contain the same characters in the same order will produce the same hash value.

For most programs the vast majority of objects are never hashed using the virtual machine's implementation of hashCode( ). First, not all programs use hash tables, and those that do use hash tables do not include each and every object in a hash table. Second, as explained above, important classes of objects override the virtual machine's hashCode( ) implementation.

The desirable properties of the virtual machine hashCode( ) operation are thus summarized as follows:

1. It must ensure that a hash value for an object remains constant throughout the life-time of the object.
2. It must provide a good distribution of hash values.
3. It must be efficient to compute hash values.
4. It must maintain low storage requirements.

Since most objects are never hashed, to ensure low space overhead it is essential to use as little space as possible for non-hashed objects. The problem is, of course, that it is typically difficult to predict whether the hashCode( ) operation will be applied to a given object.

(2) Garbage Collection

One of the most important resources within a data processing system is the amount of memory directly available for utilization by tasks during execution. Accordingly, much interest has been directed to efficient utilization of memory and memory management strategies. An important concept in memory management is the manner in which memory is allocated to a task, deallocated and then reclaimed.

Memory deallocation and reclamation may be explicit and controlled by an executing program, or may be carried out by another special purpose program which locates and reclaims memory which is unused, but has not been explicitly deallocated. "Garbage collection" is the term used in technical literature and the relevant arts to refer to a class of algorithms utilized to carry out storage management, specifically automatic memory reclamation. There are many known garbage collection algorithms, including reference counting, mark-sweep, and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996.

An object may be located by a "reference", or a small amount of information that can be used to access the object. One way to implement a reference is by means of a "pointer" or "machine address," which uses multiple bits of information, however, other implementations are possible. General-purpose programming languages and other programmed systems often use references to locate and access objects. Such objects can themselves contain references to data, such as integers or floating-point numbers and to yet other objects. In this manner, a chain of references can be created, each reference pointing to an object which, in turn, points to another object.

Garbage collection techniques determine when an object is no longer reachable by an executing program, either directly or through a chain of pointers. When an object is no longer reachable, the memory that the object occupies can be reclaimed and reused even if it has not been explicitly deallocated by the program. To be effective, garbage collection techniques should be able to, first, identify references that are directly accessible to the executing program, and, second, given a reference to an object, identify references contained within that object, thereby allowing the garbage collector to trace transitively chains of references.

A subclass of garbage collectors known as "relocating" garbage collectors, relocates objects that are still reachable by an executing program. Relocation of an object is accomplished by making a copy of the object in another region of memory, then replacing all reachable references to the original object with references to the new copy. The memory occupied by the original object may then be reclaimed and reused. Relocating garbage collectors have the desirable property that they compact the memory used by the executing program and thereby reduce memory fragmentation, which is typically caused by non-compacting garbage collectors.

In systems that use a non-compacting garbage collector, objects never move. Once they are allocated a certain address, they remain there until they become garbage. It is therefore possible to use the address of the object as its hashCode( ). This solution is fast and has no space overhead. It also has good distribution of hash values. However, few implementations of object-oriented languages use non-compacting memory systems, since the induced fragmentation affects performance negatively.

(3) Handle-based memory systems

The original Java programming language used indirect pointers or "handles" to refer to objects. Handles were introduced to allow easy relocation of objects during garbage collection. With handles, it is easy to move objects because there is only one direct pointer to each object: the one in its handle. In such handle-based memory systems, while the object address is non-constant over the life-time of the object and therefore cannot be used for hashing, the handle address remains constant. Thus, the hashCode( ) function returned the address of the handle.

This implementation, like the object address implementation in non-compacting systems, is fast, has no space overhead, and gives a good distribution. However, other concerns, including execution efficiency, favor non-handle-based memory systems. Consequently, the use of an object's handle as its hash value is not desirable.

(4) Direct-pointer, no-handle memory systems

For performance reasons, one would want to implement object-oriented languages using compacting garbage collection algorithms that work with direct pointers. Consequently, hash codes must be implemented in a different way than by using addresses. Because objects move, their address is no longer an acceptable hash value, and there are no handles in systems using direct pointers.

The known implementation of the object-oriented language called "'Self" illustrates the most common solution. The Self implementation reserves 22 bits in a header word of every object to hold its hash value. The bits are set to a 22 bit pseudo-random value. Since most objects are never hashed, the computation of hash values is done on demand: The Self implementation does not assign the 22 bit hash value at object allocation time, but defers it until the object is first hashed. While this slows down all hash retrieval operations by an extra test, such a solution is acceptable because object allocation is more frequent than hashing for most programs.

This solution also has fast retrieval and a reasonable distribution, although the hash values in the specific case of the Self implementation are compressed into a 22 bit space, even though computers provide larger number bit words, such as 32 bits. The solution also has low storage overhead, but only if the header word can accommodate the 22 bits required to hold the hash value. However, not all systems have spare bits in a header word, let alone the 22 bits required by the aforementioned Self implementation. If hashing necessitates adding an extra header word to every object, the space cost of such an implementation may not be acceptable.

Accordingly, there is a need for a system that provides a satisfactory, space-efficient hashCode( ) function for use with a compacting garbage collector in a system that does not use handles.

SUMMARY OF THE INVENTION

In accordance with the present invention, as embodied and broadly described herein, a method for managing objects during a garbage collection operation comprises the steps of compacting objects in a memory, allocating an available memory location for a surviving object and a corresponding hash field, storing the surviving object in the available memory location, and storing a hash value for the surviving object in the hash field.

In accordance with another aspect of the present invention, as embodied and broadly described herein, a method for managing objects comprises the steps of receiving an instruction to allocate an object, locating space in a memory for the object, storing the object at the located space, and including in the stored object a header portion reflecting a hash status. The hash status is used to indicate (i) whether the object has been hashed and (ii) whether the object has a hash field.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

Introduction

Systems consistent with the present invention provide a hashCode( ) operation that is fast to compute, offers good distribution with a full 32 bit hash range, accommodates low space overhead for non-hashed objects, and does not require handles. The hashCode( ) function also accommodates a compacting garbage collector to ensure efficient use of memory.

For the purpose of this specification, the term "object" refers to a data structure that is represented in the memory of a computing system. This usage of the term object is distinct from the usage of the term "object" in "object-oriented" systems, wherein objects have associated "methods", i.e. pieces of code associated with them, which code may be invoked through a reference to the object. However, the present invention is applicable to such object-oriented systems.

In general, systems consistent with the present invention initially allocate objects without a field for hash values. Under some circumstances, the object will later be expanded by an extra field designated to hold the hash value of the object. To support this expansion without incurring a large overhead or excessive garbage collection and tracing of objects, two bits in the header of objects are designated for a "hasBeenHashed" code and a "hasHashField" code. At object allocation time, both bits are set to "0". The bits remain "0" until the first time the hashCode( ) method is invoked on the object. When initiated by a program the hashCode( ) method sets the hasBeenHashed bit to "1" and returns the address of the object as the hash value. As long as the hasBeenHashed bit is "1" and the hasHashField bit is "0", the hashCode( ) operation continues to return the address of the object as its hash value.

Systems consistent with the present invention further invoke a garbage collector to collect "dead" objects, which are no longer referenced by at least one executing program, and to relocate "surviving" objects, which are still referenced by at least one executing program. Collecting dead objects involves freeing the space in memory corresponding to dead objects, and relocating surviving objects involves compacting the surviving objects in memory to reduce fragmentation. The garbage collection process inspects the hash bits of each surviving object. If the hasBeenHashed bit is "0", nothing special needs to be done to the object. If, however, the hasBeenHashed bit is set to "1" and the hasHashField is set to "0", then the object has been hashed, but it has no added hash field. The garbage collector thus allocates an extra field at a new location in memory where the object will be relocated, stores the object's hash value in the new field, copies the object to the new location, and sets the hasHashField to "1". The object's hash value is the same as the object's old memory address. From then on, the object is one field larger than when it was originally allocated or "born", and the hash value is "internalized". The new field for the hash value is located at the end of the object. This maintains the structure of the original object and ensures that field offsets of the object's fields remain the same.

For objects with a hasHashField set to "1", the hashCode( ) operation simply returns the contents of the hash field. Otherwise, the hashCode( ) operation returns the object's memory address.

Computer System

Figure 1:
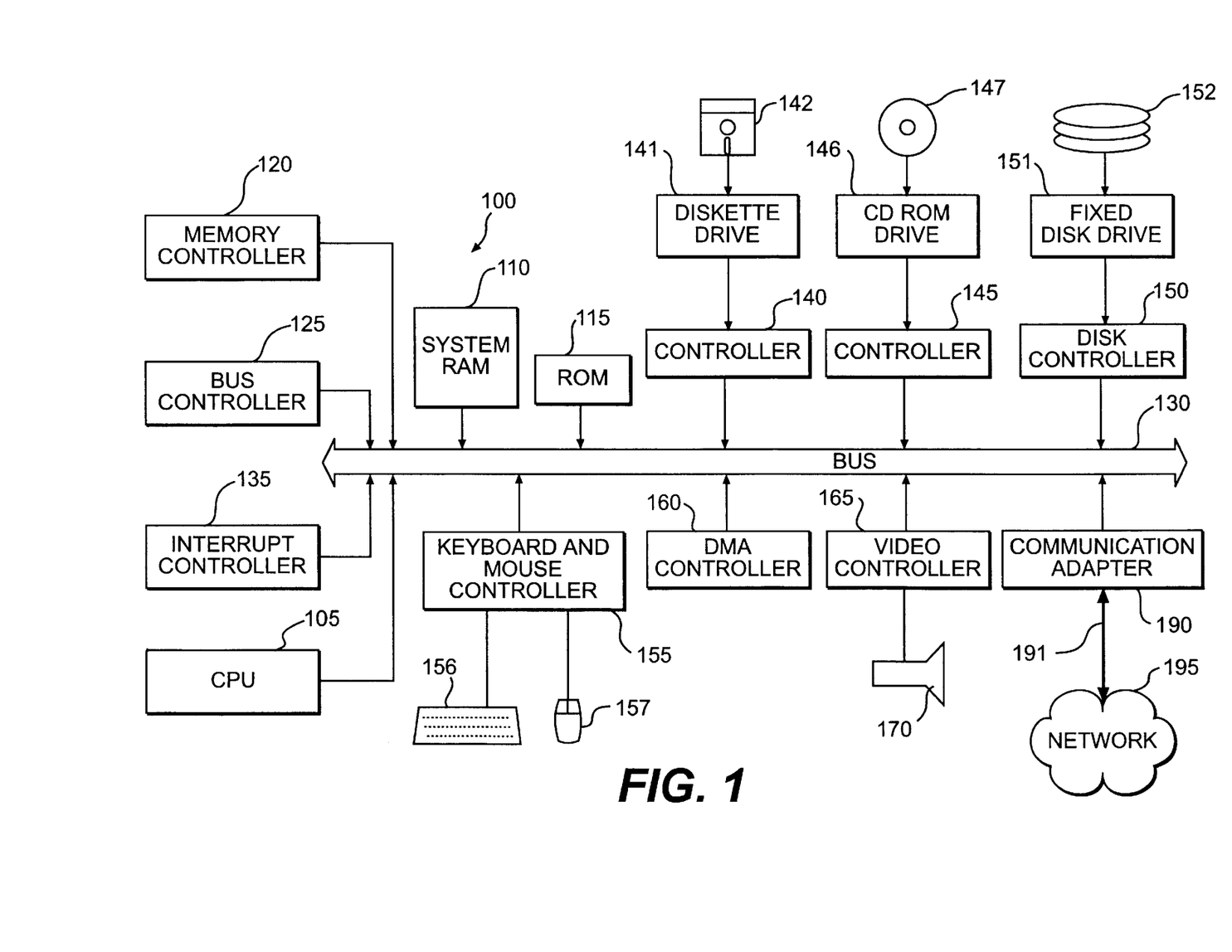
FIG. 1 is a schematic block diagram illustrating a computer architecture suitable for use with the present invention.

FIG. 1 illustrates the system architecture for a computer system with which the invention may be implemented. The exemplary computer system of FIG. 1 is for descriptive purposes only. Although the description may refer to terms commonly used in describing particular computer systems, such as in IBM PS/2 personal computer, the description and concepts equally apply to other computer systems such as network computers, workstation and even mainframe computers having architectures dissimilar to FIG. 1.

Furthermore, the implementation is described with reference to a computer system implementing the Java programming language and Java Virtual Machine specifications, although the invention is equally applicable to other computer systems having similar requirements. Specifically, the present invention may be implemented with both object oriented and non-object oriented programming systems.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. It will be obvious to those reasonably skilled in the art that other input devices, such as a pen and/or tablet may be connected to bus 130 and an appropriate controller and software, as required. DMA controller 160 is provided for performing direct memory access to RAM 110. A visual display is generated by video controller 165 which controls video display 170.

Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software. The operating system controls allocation of system resources and performs tasks such as processing scheduling, memory management, networking, and services, among things.

Allocating Objects

Figure 2:
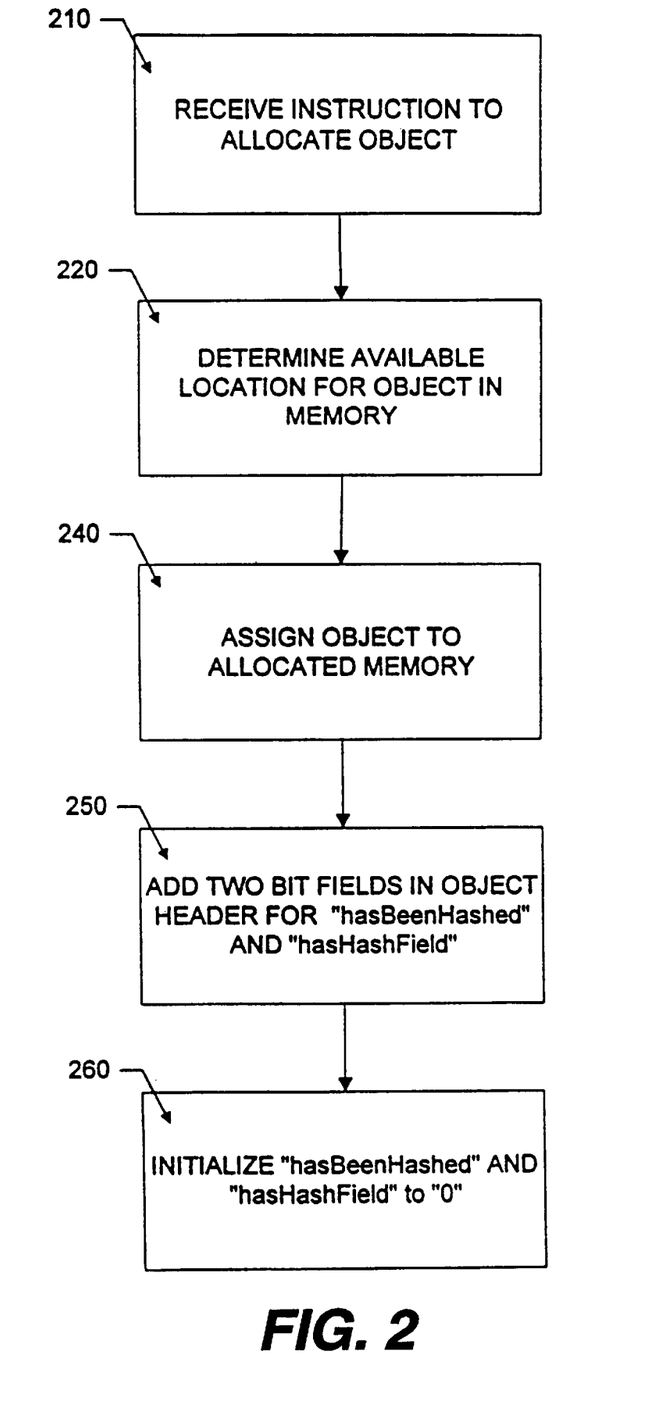
FIG. 2 is a flow chart of the steps used to allocate an object in accordance with an implementation of the present invention.

FIG. 2 is a flow chart of the steps used to allocate an object. This object allocation process will be explained with reference to FIG. 3, which is a block diagram of a memory 310, including multiple objects 320, 330, and 340, and a free space 350. As shown, each object, such as object 320, includes a header portion 360 and a data portion 370. The header 360 holds two bit fields 364 and 366 for the "hasBeenHashed" and "hasHashField" codes, respectively.

Figure 3:
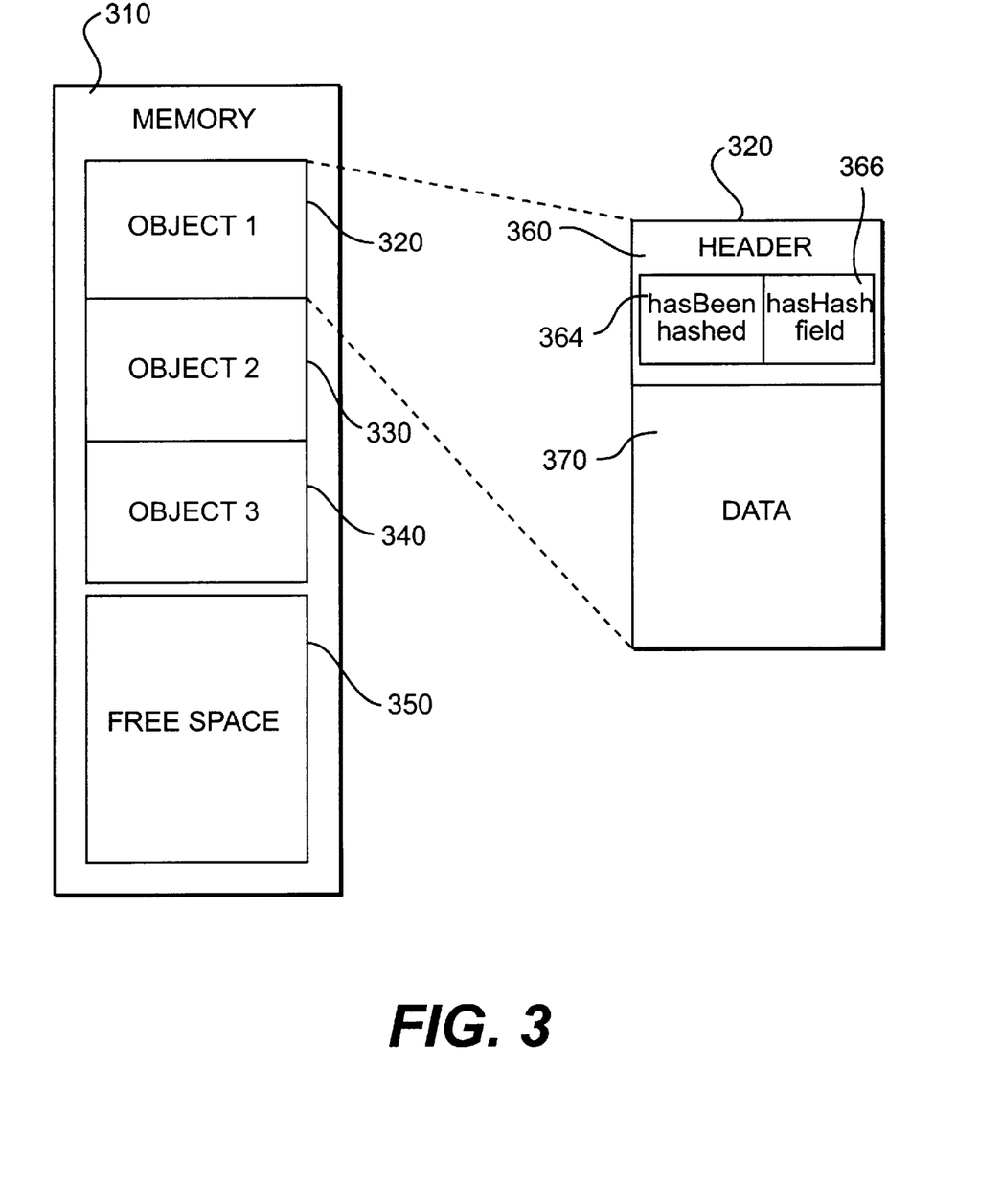
FIG. 3 is a block diagram of a memory including multiple objects.

When system 100 receives an instruction to allocate an object (step 210), it first determines an available location or space for the object in memory 310, such as RAM 110 (step 220). Once a location is identified, system 100 allocates the location for the object and assigns the object to that location (step 240). System 100 (step 260) also adds to the header for the object two bit fields for the "hasBeenHashed" and "hasHashField" codes (step 250) and initializes the bit fields to "0".

Hashing

Figure 4:
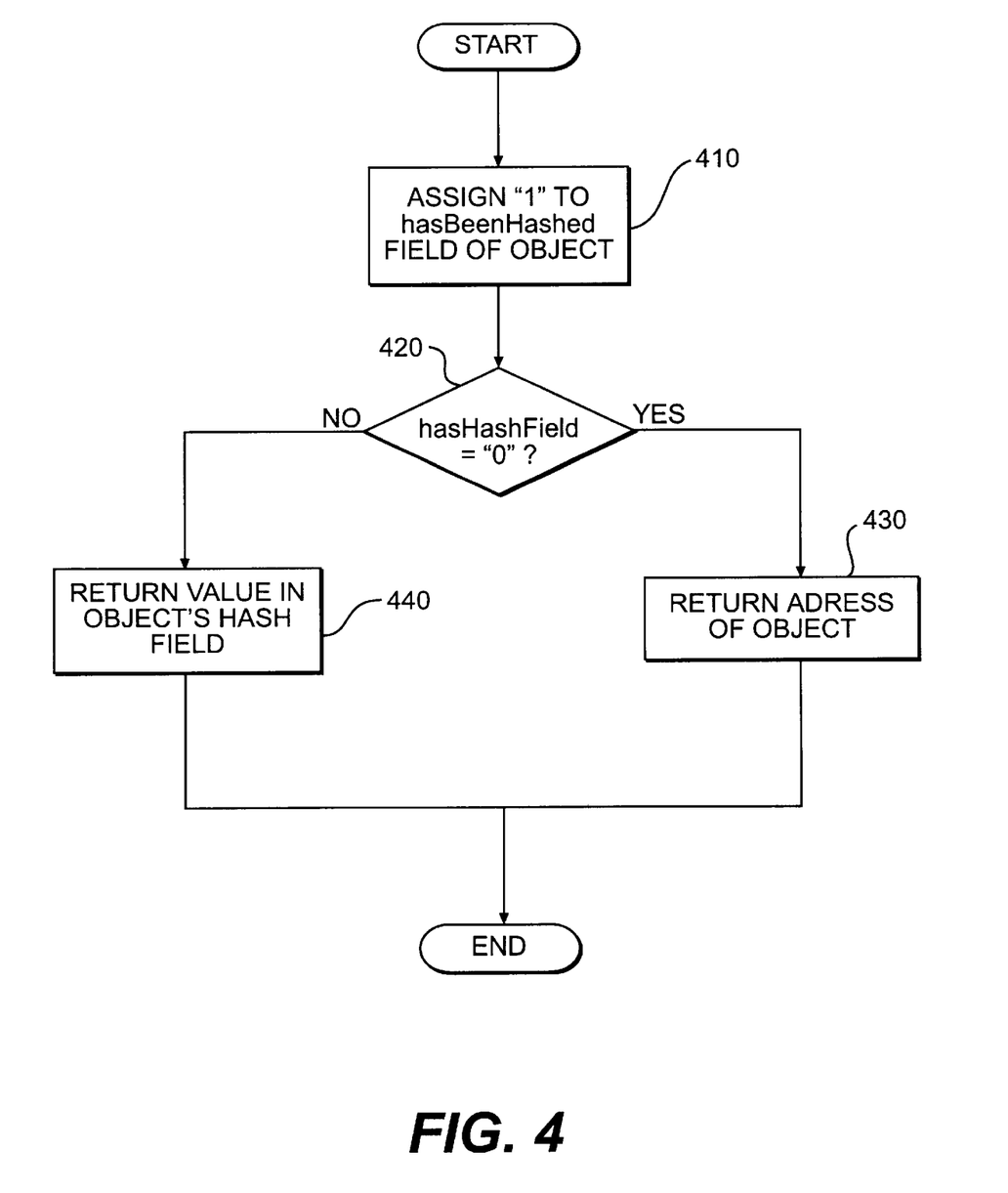
FIG. 4 is a flow chart of the steps of a hashCode( ) operation in accordance with an implementation of the present invention.

Systems consistent with the present invention perform not only a unique object allocation process, see FIG. 2, but also employ a specific hashCode( ) operation, which is illustrated in the steps of FIG. 4. In general, when a program initiates the hashCode( ) operation on a specific object, system 100 performs the following steps:

```
int hashCode(Object obj) {
        obj->hasBeenHashed = 1;
        if(obj->hasHashField == 0)
                return address(obj);
        else
                return obj->hashField;
}
```

This pseudo-code explains that system 100 assigns a "1" value to the hasBeenHashed field of the object ("obj→hasBeenHashed=1) (step 410). If system 100 determines that the hasHashField for the object is still set to "0" ("if (obj→hasHashField=0)") (step 420), then system 100 returns the object's memory address ("return address(obj)") (step 430). Otherwise, the object's hasHashField is "1" (step 420), which indicates that the object has a hash field, and system 100 returns the hash value in the object's hash field (step 440). As explained below, hashed objects that survive a garbage collection cycle acquire a hash field that contains the object's address in memory before it was relocated during the cycle.

Garbage Collection

Figure 5:
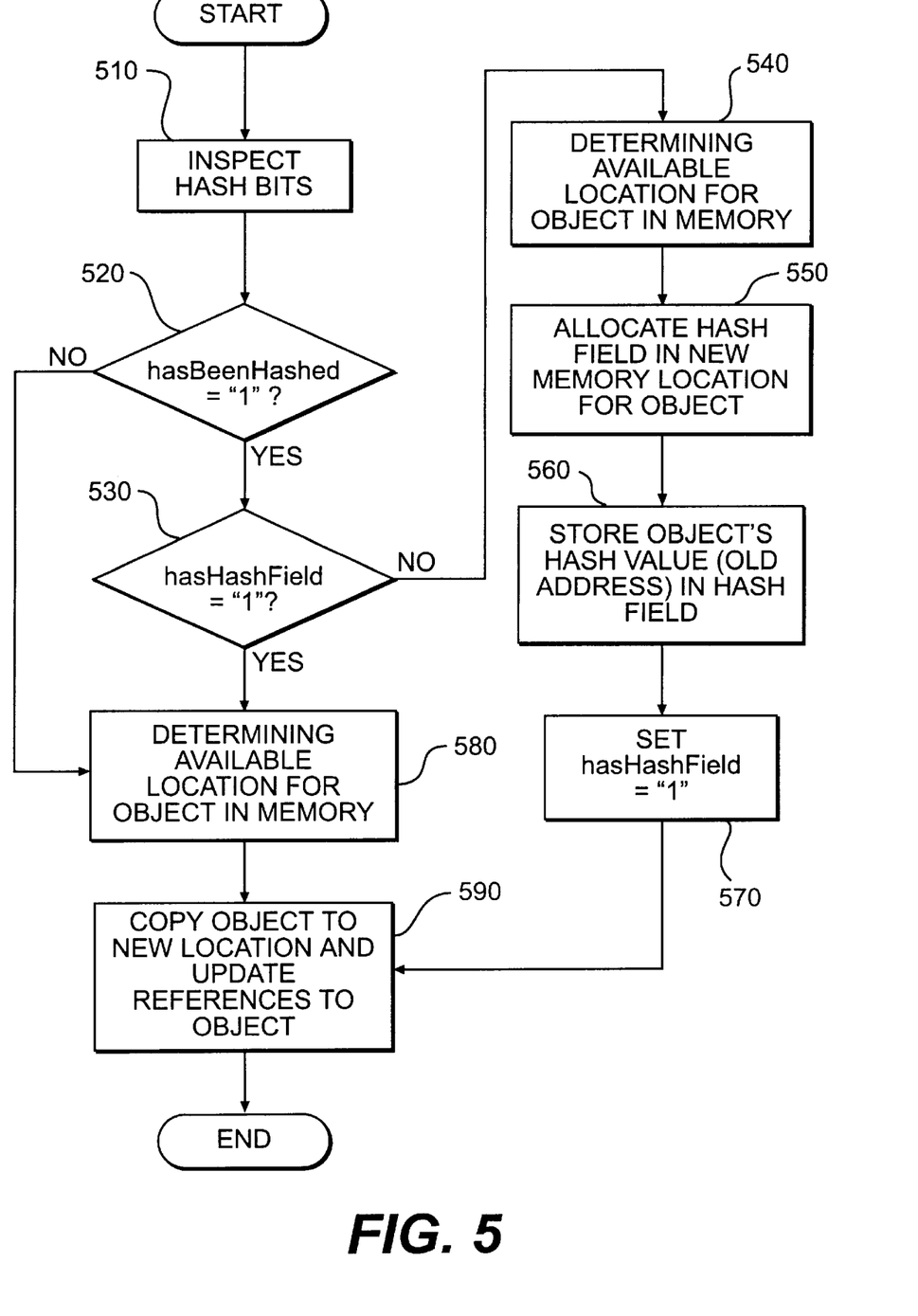
FIG. 5 is a flow chart of the steps of a compacting garbage collector in accordance with an implementation of the present invention.

Systems consistent with the present invention employ a compacting garbage collecting function in which the memory space for dead objects is reclaimed for later use. The system's garbage collector also relocates surviving objects to compact the used memory space and reduce fragmentation. Garbage collection generally takes place when specifically initiated by an application or when the memory is full and additional space is required for program execution. FIG. 5 is a flow chart of the steps of a compacting garbage collector in accordance with an implementation of the present invention.

In general, the garbage collector inspects the hash bits in the header of each surviving object in memory (step 510). If the hasBeenHashed bit is set to "0" (step 520), which means that the object has not been hashed, then the garbage collector determines an available location for the surviving object in the memory (step 580), and copies the surviving object to the new location and updates any program references to the object to reflect the object's new address (step 590).

Otherwise, the garbage collector checks the contents of the hasHashField (step 530). If it determines that the hasBeenHashed field is set to "1" but the hasHashField is set to "0" (step 530), meaning the object has been hashed but has no hash field, then the garbage collector performs steps 540 to 570. Specifically, the garbage collector determines an available location for the surviving object in the memory (step 540). The major difference between this step 540 and step 580 is that step 540 considers the object's new, larger size as a result of appending a hash field at the end of the object to hold the object's hash value, which may be the object's address before being relocated by the garbage collector.

After the garbage collector finds a new location for the surviving object (step 540), it allocates a hash field adjacent to the new memory location for the object (step 550 and stores the object's hash value in the new field (step 560). Then, the garbage collector sets the object's hasHashField to "1", (step 570) which indicates that the object has a hash field with a value, and copies the surviving object to the new location and updates any program references to the object to reflect the object's new address (step 590).

If, however, both the hasBeenHashed and hasHashField field are set to "1" (step 530), in which case the surviving object already has a hash field with a hash value, then the garbage collector simply performs the relocating, copying, and updating steps 580 and 590.

With this procedure, the garbage collector relocates hashed objects while compacting all of the surviving objects in the memory.

Figure 6A:
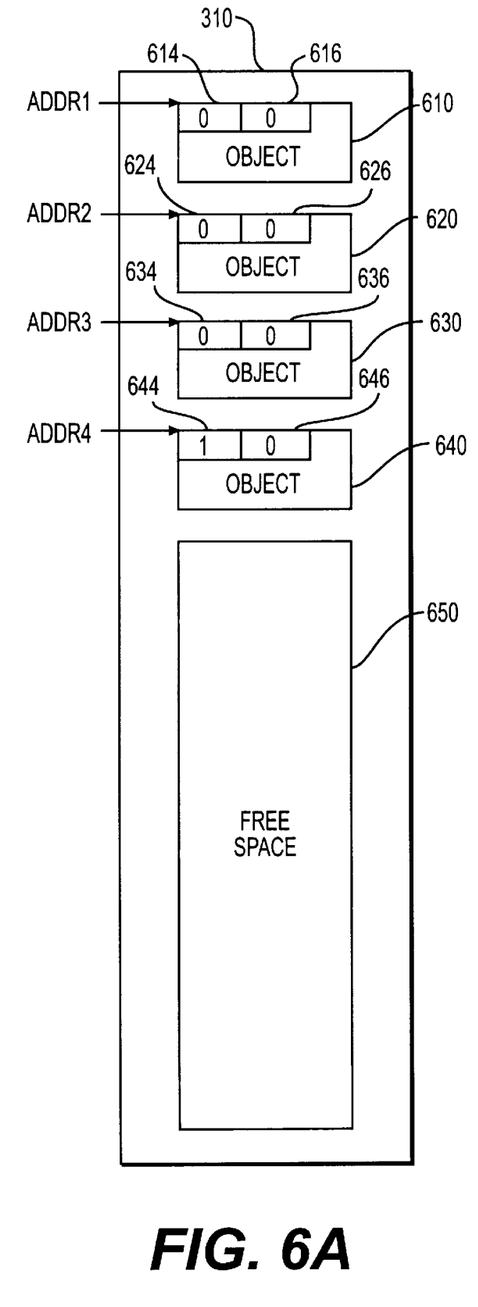
FIGS. 6A and 6B are block diagrams of a memory including multiple objects before and after execution of the compacting garbage collector.

FIG. 6A is a block diagram of memory 310 used to illustrate an example of the process used to relocate surviving objects and to compact the space in memory 310 for surviving objects. Initially, memory 310 includes multiple objects 610, 620, 630, and 640, with two one-bit fields (614, 624, 634, and 644) (616, 626, 636, and 646) in the header portion for a hasBeenHashed bit and a hasHashField bit. Because memory 310 is not full, it also includes free space 650. Each object is located at a particular location, which is noted in the figure by the corresponding addresses, ADDR1 for object 610, ADDR2 for object 620, ADDR3 for object 630, and ADDR4 for object 640.

As shown, none of the objects, except for object 640, has been hashed. Object 640 has been hashed, as indicated by the hasBeenHashed field 644 set to "1", but has no hash field, as indicated by the hasHashField 646 set to "0". Because in this example object 620 is no longer referenced, the garbage collector reclaims the space for that object.

Figure 6B:
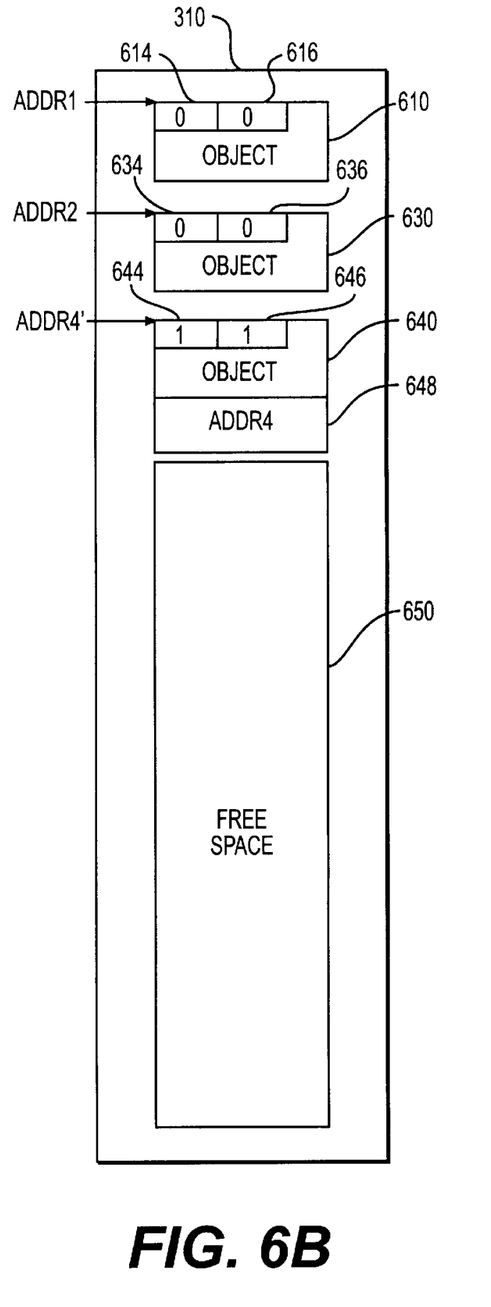

After reclaiming the space for object 630, the garbage collector relocates object 640 to a new location at ADDR4' (which is this case is the same as ADDR3), as seen in FIG. 6B. When relocating object 640, the garbage collector appends a hash field 648 for the object's old address ("ADDR4") and sets the object's hasHashField to "1". In this way, the garbage collector relocates surviving object 640 and compacts the objects in memory 310 to reduce fragmentation. In this way, object 640's hash value, i.e. ADDR4, remains the same despite the fact that the object was relocated to ADDR4'.

Although this example shows the free space 650 at the bottom or behind the space occupied by objects, in practice free space may be scattered throughout memory 310. By reducing memory fragmentation, the garbage collector reduces the number of free spaces within memory 310 and compacts all surviving objects into the fewest number of memory segments.

Generational Systems

Generational memory systems allocate objects in a small "young" space, as opposed to "old" space assigned to objects that have been in existence for a sufficiently long time according to certain criteria. Such systems improve performance by keeping new and active objects in the small region of memory, which can be garbage collected more efficiently. However, restricting new objects to a small area of memory may negatively affect the distribution of hash values. In general, most objects are hashed while they are still young and therefore receive a hash value from the limited range of addresses in the young space. For example, a typical young space may be 512 kb. Assuming word-aligned objects, the maximum number of different hash values is 128 k or just 17 bits.

To recover a good distribution of hash values, a pseudo-random number can be combined with the object's address before returning it as the hash value. The random number expands the range of hash values to 32 bits (or another desirable size). The random number stays constant for the duration of one collection cycle of the young space. After compaction of the young space, the current random number is no longer needed because the garbage collector has internalized the hash values for all objects that used it. The garbage collector then replaces the random number by a new one so that in the next cycle through young space, an object that is hashed for the first time will receive a new hash value, even if other objects occupied the same address during a previous cycle.

Conclusion

Systems consistent with the present invention thus implement a hashCode( ) operation that has high efficiency and good distribution properties for handle-less compacting memory systems. The process requires only 2 bits of space in the majority of objects that have not been hashed, and 2 bits plus a word (or whatever size hash value is desired) in objects that have been hashed and subsequently relocated.

In summary, the object's address is its hash value for as long as possible, i.e., until the object is relocated. When relocation happens and the address of the object changes, the object is expanded to internalize the hash value, which is the object's address before relocation. Finally, in memory systems where certain (or all) areas are never compacted, this hash code implementation automatically reverts to a solution, which uses just 2 bits of additional space over the space-wise optimal technique of using object addresses in non-relocating systems.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A method for managing objects during a garbage collection operation, the method comprising the steps, performed by a processor, of:

compacting a memory containing a set of objects, including hashed objects having a hash value that is a function of the hashed object's address in the memory;

allocating an available memory location for a surviving object and a corresponding hash field, wherein the surviving object corresponds to a particular hashed object;

storing the surviving object in the available memory location; and storing a value for the surviving object in the hash field, wherein the value stored in the hash field is set to the function of an address for the particular hashed object in the memory.

2. The method of claim 1, wherein the compacting step includes the substep of:

discarding any dead objects from the memory.

3. The method of claim 2, wherein programs include references to object, and wherein the discarding step includes the substep of:

identifying stored objects that have no program references as dead objects.

4. The method of claim 2, wherein programs include references to stored objects, and wherein the discarding step includes the substep of:

reclaiming memory for the stored objects that are no longer referenced by an executing program.

5. The method of claim 1, wherein the allocating step includes the substep of:

determining whether the surviving object has been hashed; and designating the available memory location for the surviving hashed object.

6. The method of claim 5, wherein the determining step includes the substep of:

ascertaining whether the surviving object does not already have a corresponding hash field.

7. The method of claim 1, wherein the step of storing the surviving object in the available memory location includes the substep of:

copying the surviving object from a previous memory location to the available memory location.

8. The method of claim 7, further including the step of:

indicating that the previous memory location is available to store objects.

9. The method of claim 7, wherein the copying step includes the substep of:

using a memory address for the previous memory location as the hash value.

10. The method of claim 9, wherein the using step includes the substep of:

modifying the memory address with a random number.

11. The method of claim 1, wherein programs include references to stored objects, further comprising the step of:

updating any program references for the surviving object to reflect the surviving object's new address at the available memory location.

12. The method of claim 1, wherein the allocating step includes the substep of:

determining space requirements to store the surviving object and the corresponding hash field in the memory; and identifying the available memory location based on the space requirements.

13. A method for managing objects comprising the steps, performed by a processor, of:

receiving an instruction to allocate an object;

locating space in a memory for the object;

storing the object at the located space; and including in the stored object a header portion reflecting a hash status, wherein the hash status is used to indicate (i) whether the object has been hashed and (ii) whether the object has a hash field.

14. The method of claim 13, further including the step of:

receiving a request to hash the object; and returning a hash value for the object.

15. The method of claim 14, wherein the returning step includes the substep of:

providing an address corresponding to the object's location in the memory when the hash status indicates that the object has not been hashed.

16. The method of claim 15, wherein the providing step includes the substep of:

modifying the address with a random number.

17. The method of claim 14, wherein the returning step includes the substep of:

providing a value from the object's hash field when the hash status indicates that the object has a hash field.

18. Apparatus for managing objects during a garbage collection operation, comprising:

a memory compactor configured to compact a memory containing a set of objects, including hashed objects having a hash value that is a function of the hashed object's address in the memory;

a memory allocator configured to allocate an available memory location for a surviving object and a corresponding hash field, wherein the surviving object corresponds to a particular hashed object; and storing means configured to store the surviving object in the available memory location and a hash value for the surviving object in the hash field, wherein the value stored in the hash field is set to the function of an address for the particular hashed object in the memory.

19. The apparatus of claim 18, wherein the compactor includes:

means configured to discard any dead objects from the memory.

20. The apparatus of claim 19, wherein programs include references to object, and wherein the means configured to discard any dead objects from the memory includes:

means configured to identify stored objects that have no program references as dead objects.

21. The apparatus of claim 19, wherein programs include references to stored objects, and wherein the discarding means includes:

means configured to reclaim memory for the stored objects that are no longer referenced by an executing program.

22. The apparatus of claim 18, wherein the memory allocator includes:

means configured to determine whether the surviving object has been hashed; and means configured to designate the available memory location for the surviving hashed object.

23. The apparatus of claim 22, wherein the determining means includes:

means configured to ascertain whether the surviving object does not already have a corresponding hash field.

24. The apparatus of claim 18, wherein the storing means includes:

copying means configured to copy the surviving object from a previous memory location to the available memory location.

25. The apparatus of claim 24, further including:

an indicator configured to indicate that the previous memory location is available to store objects.

26. The apparatus of claim 24, wherein the storing means includes:

means configured to use a memory address for the previous memory location as the hash value.

27. The apparatus of claim 26, wherein the means configured to use a memory address for the previous memory location as the hash value includes:

modifying means configured to modify the memory address with a random number.

28. The apparatus of claim 18, wherein programs include references to stored objects, further comprising:

means configured to update any program references for the surviving object to reflect the surviving object's new address at the available memory location.

29. The apparatus of claim 18, wherein the allocator includes:

means configured to determine space requirements to store the surviving object and the corresponding hash field in the memory; and means configured to identify the available memory location based on the space requirements.

30. Apparatus for managing objects comprising:

an allocator configured to receive an instruction to allocate an object and locate space in a memory for the object;

means configured to store the object at the located space; and means configured to include in the stored object a header portion reflecting a hash status, wherein the hash status is used to indicate (i) whether the object has been hashed and (ii) whether the object has a hash field.

31. The apparatus of claim 30, further comprising:

a request receiver configured to receive a request to hash the object; and means configured to return a hash value for the object.

32. The apparatus of claim 31, wherein the returning means includes:

means configured to provide an address corresponding to the object's location in the memory when the hash status indicates that the object has not been hashed.

33. The apparatus of claim 32, wherein the providing means includes:

modifying means configured to modify the address with a random number.

34. The apparatus of claim 31, wherein the returning means includes:

means configured to provide a value from the object's hash field when the hash status indicates that the object has a hash field.

35. A computer program product comprising:

a computer usable medium having computable readable code embodied therein for managing objects during a garbage collection operation, the computer usable medium comprising:

a compacting module configured to compact a memory containing a set of objects, including hashed objects having a hash value that is a function of the hashed object's address in the memory;

an allocating module configured to allocate an available memory location for a surviving object and a corresponding hash field, wherein the surviving object corresponds to a particular hashed object; and a memory storing module configured to store the surviving object in the available memory location and a hash value for the surviving object in the hash field, wherein the value stored in the hash field is set to the function of an address for the particular hashed object in the memory.

36. The computer program product of claim 35, wherein the compacting module includes:

a discard module configured to discard any dead objects from the memory.

37. The computer program product of claim 36, wherein programs include references to object, and wherein the discard module includes:

a module configured to identify stored objects that have no program references as dead objects.

38. The computer program product of claim 36, wherein programs include references to stored objects, and wherein the discard module includes:

a reclaim module configured to reclaim memory for the stored objects that are no longer referenced by an executing program.

39. The computer program product of claim 35, wherein the allocating module includes:

a determining module configured to determine whether the surviving object has been hashed; and a designating module configured to designate the available memory location for the surviving hashed object.

40. The computer program product of claim 39, wherein the determining module includes:

a module configured to ascertain whether the surviving object does not already have a corresponding hash field.

41. The computer program product of claim 35, wherein the memory storing module includes:
a copying module configured to copy the surviving object from a previous memory location to the available memory location.

42. The computer program product of claim 41, further comprising:
an indicating module configured to indicate that the previous memory location is available to store objects.

43. The computer program product of claim 41, wherein the memory storing module includes:
a module configured to use a memory address for the previous memory location as the hash value.

44. The computer program product of claim 43, wherein the module configured to use a memory address for the previous memory location as the hash value includes:
a modifying module configured to modify the memory address with a random number.

45. The computer program product of claim 35, wherein programs include references to stored objects, further comprising:
a updating module configured to update any program references for the surviving object to reflect the surviving object's new address at the available memory location.

46. The computer program product of claim 35, wherein the allocating module includes:
a determining module configured to determine space requirements to store the surviving object and the corresponding hash field in the memory; and
a module configured to identify the available memory location based on the space requirements.

47. A computer program product comprising:
a computer usable medium having computer readable code embodied therein for managing objects, the computer usable medium comprising:
an allocating module configured to receive an instruction to allocate an object and locate space in a memory for the object;
a memory store module configured to store the object at the located space; and
a module configured to include in the stored object a header portion reflecting a hash status, wherein the hash status is used to indicate (i) whether the object has been hashed and (ii) whether the object has a hash field.

48. The computer program product of claim 47, further comprising:
a receiving module configured to receive a request to hash the object; and
a return module configured to return a hash value for the object.

49. The computer program product of claim 48, wherein the return module includes:
an address providing module configured to provide an address corresponding to the object's location in the memory when the hash status indicates that the object has not been hashed.

50. The computer program product of claim 49, wherein the address providing module includes:
a modifying module configured to modify the address with a random number.

51. The computer program product of claim 48, wherein the return module includes:
a module configured to providing a value from the object's hash field when the hash status indicates that the object has a hash field.

52. A method for managing objects during a garbage collection operation, the method comprising the steps, performed by a processor, of:
compacting a memory;
allocating an available memory location for a surviving object and a corresponding hash field by (i) determining whether the surviving object has been hashed and (ii) designating the available memory location for the surviving object;
storing the surviving object in the available memory location; and
storing a hash value for the surviving object in the hash field.

53. The method of claim 52, wherein the allocating step includes the substep of:
ascertaining whether the surviving object does not already have a corresponding hash field.

54. Apparatus for managing objects during a garbage collection operation, comprising:
a memory compactor configured to compact a memory;
an memory allocator configured to allocate an available memory location for a surviving object and a corresponding hash field by determining whether the surviving object has been hashed and designating the available memory location for the surviving object; and
storing means configured to store the surviving object in the available memory location and a hash value for the surviving object in the hash field.

55. The apparatus of claim 54, wherein the allocating means includes:
means configured to ascertain whether the surviving object does not already have a corresponding hash field.

56. A computer program product comprising:
a computer usable medium having computable readable code embodied therein for managing objects during a garbage collection operation, the computer usable medium comprising:
a compacting module configured to compact a memory;
an allocating module configured to allocate an available memory location for a surviving object and a corresponding hash field by determining whether the surviving object has been hashed and designating the available memory location for the surviving hashed object; and
a memory storing module configured to store the surviving object in the available memory location and a hash value for the surviving object in the hash field.

57. The computer program product of claim 56, wherein the allocating module includes:
a module configured to ascertain whether the surviving object does not already have a corresponding hash field.

58. An apparatus for managing objects during a garbage collection operation, comprising:
a processor; and
a storage medium comprising program code that, when executed by the processor, compacts a memory,
allocates an available memory location for surviving object and a corresponding hash field by (i) determining whether the surviving object has been hashed and (ii) designating the available memory location for the surviving object, stores the surviving object in the available memory location, and stores a hash value for the surviving object in the hash field.

59. The apparatus of claim 58, wherein the processor ascertains whether the surviving object does not already have a corresponding hash field when allocating the available memory location for the surviving object.

60. A computer-readable medium containing instructions for performing a medium for managing objects during a garbage collection operation, the method comprising:

compacting a memory;

allocating an available memory location for a surviving object and a corresponding hash field by (i) determining whether the surviving object has been hashed and (ii) designating the available memory location for the surviving object;

storing the surviving object in the available memory location; and storing a hash value for the surviving object in the hash field.

61. The computer-readable medium of claim 60, wherein allocating comprises:

ascertaining whether the surviving object does not already have a corresponding hash field.

62. A computer-readable medium containing instructions for performing a method for managing objects during a garbage collection operation, the method comprising:

compacting a memory containing a set of objects, including hashed objects having a hash value that is a function of the hashed object's address in the memory;

allocating an available memory location for a surviving object and a corresponding hash field, wherein the surviving object corresponds to a particular hashed object;

storing the surviving object in the available memory location; and storing a value for the surviving object in the hash field, wherein the value stored in the hash field is set to the function of an address for the particular hashed object in the memory.

63. The computer-readable medium of claim 62, wherein compacting comprises:

discarding any dead objects from the memory.

64. The computer-readable medium of claim 63, wherein programs include references to object, and wherein discarding comprises:

identifying stored objects that have no program references as dead objects.

65. The computer-readable medium of claim 63, wherein program instructions include references to stored objects, and wherein discarding comprises:

reclaiming memory for the stored objects that are no longer referenced by an executing program.

66. The computer-readable medium of claim 62, wherein allocating comprises:

determining whether the surviving objects has been hashed; and designating the available memory location for the surviving hashed object.

67. The computer-readable medium of claim 66, wherein determining further comprises:

ascertaining whether the surviving object does not already have a corresponding hash field.

68. The computer-readable medium of claim 62, wherein storing the surviving object in the available memory location comprises:

copying the surviving object from a previous memory location to the available memory location.

69. The computer-readable medium of claim 68, wherein the method further comprises:

indicating that the previous memory location is available to store objects.

70. The computer-readable medium of claim 68, wherein copying comprises:

using a memory address for the previous memory location as the hash value.

71. The computer-readable medium of claim 70, wherein using comprises:

modifying the memory address with a random number.

72. The computer-readable medium of claim 62, wherein program instructions include references to stored objects, and wherein the method further comprises:

updating any program instruction references for the surviving object to reflect the surviving object's new address at the available memory location.

73. The computer-readable medium of claim 62, wherein allocating further comprises:

determining space requirements to store the surviving object and the corresponding hash field in the memory; and identifying the available memory location based on the space requirements.

74. An apparatus for managing objects during a garbage collection operation, comprising:

a processor; and a storage medium comprising program code that, when executed by the processor, compacts a memory containing a set of objects, including hashed objects having a hash value that is a function of the hashed object's address in the memory, allocates an available memory location for a surviving object and a corresponding hash field, wherein the surviving object corresponds to a particular hashed object, stores the surviving object in the available memory location, and stores a value for the surviving object in the hash field, wherein the value stored in the hash field is set to the function of an address for the particular hashed object in the memory.

75. The apparatus of claim 74, wherein the processor discards any dead objects from the memory when compacting the memory.

76. The apparatus of claim 75, wherein program instructions include references to object, and wherein the processor identifies stored objects that have no programs instruction references as dead objects when discarding any dead objects.

77. The apparatus of claim 75, wherein program instructions include references to stored objects, and wherein the processor reclaims memory for the stored objects that are no longer referenced by an executing program, when allocating the available memory location for the surviving object.

78. The apparatus of claim 74, wherein the processor determines whether the surviving object has been hashed, and designates the available memory location for the surviving hashed object, when allocating the available memory location for the surviving object.

79. The apparatus of claim 78, wherein the processor ascertains whether the surviving object does not already have a corresponding hash field when determining whether the surviving object has been hashed.

80. The apparatus of claim 74, wherein the processor copies the surviving object from a previous memory location to the available memory location when storing the surviving object in the available memory location.

81. The apparatus of claim 80, wherein the processor further indicates that the previous memory location is available to store objects.

82. The apparatus of claim 80, wherein the processor uses a memory address for the previous memory location as the hash value when storing the surviving object in the available memory location.

83. The apparatus claim 82, wherein the processor modifies the memory address with a random number when using the memory address for the previous memory location as the hash value.

84. The apparatus of claim 74, wherein program instructions include references to stored objects, and wherein the processor further updates any program instruction references for the surviving object to reflect the surviving object's new address at the available memory location.

85. The apparatus of claim 74, wherein the processor determines space requirements to store the surviving object and the corresponding hash field in the memory, and identifies the available memory location based on the space requirements, when allocating the available memory location for the surviving object.

* * * * *